United States Patent
Chung et al.

(10) Patent No.: US 7,746,963 B2
(45) Date of Patent: Jun. 29, 2010

(54) METHODS AND APPARATUS FOR FREQUENCY TRACKING OF A RECEIVED SIGNAL

(75) Inventors: Seong Taek Chung, Redwood City, CA (US); Krishna Kiran Mukkavilli, San Diego, CA (US); Vinay Murthy, San Diego, CA (US); Tao Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 865 days.

(21) Appl. No.: 11/557,921

(22) Filed: Nov. 8, 2006

(65) Prior Publication Data

US 2007/0179782 A1 Aug. 2, 2007

Related U.S. Application Data

(60) Provisional application No. 60/756,737, filed on Jan. 6, 2006.

(51) Int. Cl.
*H04L 27/00* (2006.01)
(52) U.S. Cl. .................. 375/344; 375/260; 375/326
(58) Field of Classification Search .......... 375/260, 375/326, 344
See application file for complete search history.

(56) References Cited

U.S. PATENT DOCUMENTS

| 2004/0005018 | A1 | 1/2004 | Zhu et al. |
| 2004/0005022 | A1* | 1/2004 | Zhu et al. ............... 375/365 |
| 2006/0115025 | A1* | 6/2006 | Kim et al. ............... 375/343 |
| 2006/0133527 | A1* | 6/2006 | Yu et al. ................. 375/260 |
| 2007/0230591 | A1* | 10/2007 | Choi et al. .............. 375/260 |
| 2008/0043613 | A1* | 2/2008 | Yang et al. ............. 370/208 |

FOREIGN PATENT DOCUMENTS

| WO | 2004/049618 A1 | 6/2004 |
| WO | 2005/074224 A1 | 8/2005 |

* cited by examiner

*Primary Examiner*—David B Lugo
(74) *Attorney, Agent, or Firm*—Gerald P. Joyce, III (57) ABSTRACT

Methods and apparatus for frequency tracking of a received signal. In an aspect, a method is provided wherein the received signal comprises one or more symbols having a periodic structure. The method comprises receiving a plurality of samples of a selected symbol that comprises pilot signals scrambled with data and determining a window size and a periodicity factor. The method also comprises accumulating a correlation between samples in a first window and samples in a second window to produce an accumulated correlation value, wherein the first and second windows have a size and a separation based on the window size and the periodicity factor, respectively, and deriving a frequency error estimate based on the accumulated correlation value.

15 Claims, 7 Drawing Sheets

METHODS AND APPARATUS FOR FREQUENCY TRACKING OF A RECEIVED SIGNAL

CLAIM OF PRIORITY UNDER 35 U.S.C. §119

The present Application for Patent claims priority to Provisional Application No. 60/756,737 entitled "AFC TRACKING IN WIC/LIC OFDM SYMBOLS" filed Jan. 6, 2006, and assigned to the assignee hereof and hereby expressly incorporated by reference herein.

BACKGROUND

1. Field

The present application relates generally to the transmission of information over a distribution network, and more particularly, to methods and apparatus for improved frequency tracking of a received signal.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner and in such a way as to increase bandwidth utilization and power efficiency.

In current content delivery/media distribution systems, real time and non real time services are packed into a transmission frame and delivered to devices on a network. For example, a communication network may utilize Orthogonal Frequency Division Multiplexing (OFDM) to provide communications between a network server and one or more mobile devices. This technology provides a transmission frame having data slots that are packed with services to be delivered over a distribution network as a transmit waveform.

Typically, the transmission frame is delivered over a network as a transmit waveform. Devices in communication with the network acquire and track the waveform so that the transmitted content can be recovered. Unfortunately, conventional systems may take some time to acquire and track the waveform. For example, if a residual frequency error at the end of time division multiplexed pilot signals provided for synchronization is high, then the data modulation may not be properly decoded. Hence it is very important that the frequency error and timing error be minimized at the receiver before the commencement of data demodulation.

Therefore it could be desirable to have a system that operates to quickly acquire and track the frequency and timing of a received waveform so that information encoded in the waveform can be accurately decoded.

SUMMARY

In one or more aspects, a frequency tracking system, comprising methods and apparatus, is provided that operates to quickly acquire and frequency track a received waveform. In an aspect, the tracking system operates to utilize the periodic structure of wide and local area identification symbols and pilot symbols provided at the start of the received waveform to generate a frequency error estimate that is used to adjust an initial frequency estimate so that the received waveform can be quickly acquired and frequency tracked.

In an aspects, a method is provided for frequency tracking of a received signal, wherein the received signal comprises one or more symbols having a periodic structure. The method comprises receiving a plurality of samples of a selected symbol that comprises pilot signals scrambled with data and determining a window size and a periodicity factor. The method also comprises accumulating a correlation between samples in a first window and samples in a second window to produce an accumulated correlation value, wherein the first and second windows have a size and a separation based on the window size and the periodicity factor, respectively, and deriving a frequency error estimate based on the accumulated correlation value.

In another aspect, an apparatus is provided for frequency tracking of a received signal, wherein the received signal comprises one or more symbols having a periodic structure. The apparatus comprises input logic configured to receive a plurality of samples of a selected symbol that comprises pilot signals scrambled with data and control logic configured to determine a window size and a periodicity factor. The apparatus also comprises a correlator configured to accumulate a correlation between samples in a first window and samples in a second window to produce an accumulated correlation value, wherein the first and second windows have a size and a separation based on the window size and the periodicity factor, respectively and a phase accumulator configure to derive a frequency error estimate based on the accumulated correlation value.

In another aspect, an apparatus is provided for frequency tracking of a received signal, wherein the received signal comprises one or more symbols having a periodic structure. The apparatus comprises means for receiving a plurality of samples of a selected symbol that comprises pilot signals scrambled with data and means for determining a window size and a periodicity factor. The apparatus also comprises means for accumulating a correlation between samples in a first window and samples in a second window to produce an accumulated correlation value, wherein the first and second windows have a size and a separation based on the window size and the periodicity factor, respectively; and means for deriving a frequency error estimate based on the accumulated correlation value.

In another aspect, a computer-readable medium is provided that has a computer program comprising instructions, which when executed by at least one processor, operate to provide frequency tracking of a received signal, wherein the received signal comprises one or more symbols having a periodic structure. The computer program comprises instructions for receiving a plurality of samples of a selected symbol that comprises pilot signals scrambled with data and instructions for determining a window size and a periodicity factor. The computer program also comprises instructions for accumulating a correlation between samples in a first window and samples in a second window to produce an accumulated correlation value, wherein the first and second windows have a size and a separation based on the window size and the periodicity factor, respectively; and instructions for deriving a frequency error estimate based on the accumulated correlation value.

In another aspect, at least one processor is provided that is configured to perform a method for frequency tracking of a received signal, wherein the received signal comprises one or more symbols having a periodic structure. The method comprises receiving a plurality of samples of a selected symbol that comprises pilot signals scrambled with data and determining a window size and a periodicity factor. The method also comprises accumulating a correlation between samples in a first window and samples in a second window to produce an accumulated correlation value, wherein the first and second windows have a size and a separation based on the window size and the periodicity factor, respectively; and deriving a frequency error estimate based on the accumulated correlation value.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following description when taken in conjunction with the accompanying drawings wherein.

DESCRIPTION

In one or more aspects, a frequency tracking system is provided for fast acquisition and frequency tracking of a received waveform. For the purpose of this description, aspects of the frequency tracking system are described herein with reference to a forward link only communication network that utilizes Orthogonal Frequency Division Multiplexing to provide communications between a network server and one or more mobile devices. For example, in an aspect of an OFDM system, the server transmits a transmit waveform that comprises a transmission frame having multiplexed content flows with a particular arrangement, sequence, interleaving, and/or other encoding of real-time and/or other than real-time services. Such a waveform comprises time division multiplex (TDM1 and TDM2) pilot signals, wide area identifiers (WIC), local area identifiers (LIC), overhead information symbols (OIS), and data symbols. The data symbols are used to transport services from the server to receiving devices.

The system is especially well suited for use in wireless communication networks, but may be used in any type of wireless environment, including but not limited to, public networks, such as the Internet, private networks, such as virtual private networks (VPN), local area networks, wide area networks, long haul networks, or any other type of wireless network.

Figure 1:
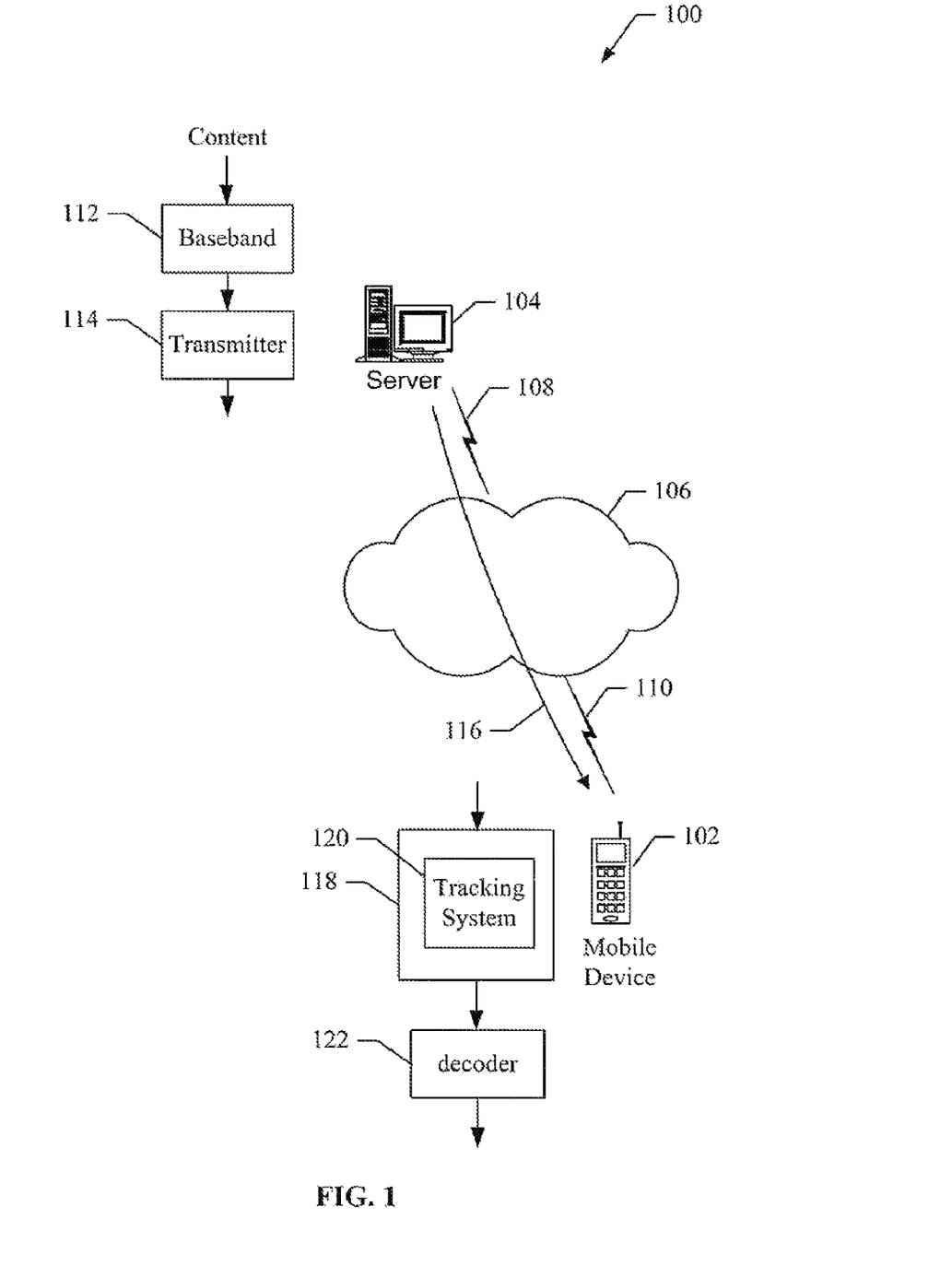
FIG. 1 shows a network that comprises an aspect of a frequency tracking system.

FIG. 1 shows a network 100 that comprises an aspect of a frequency tracking system. The network 100 comprises a mobile device 102, a server 104, and a data network 106. For the purpose of this description, it will be assumed that the data network 106 operates to provide communications between the server 104 and one or more mobile devices using OFDM technology; however, aspects of the frequency tracking system are suitable for use with other transmission technologies as well.

In one aspect, the server 104 operates to provide services that may be subscribed to by devices in communication with the network 106. The server 104 is coupled to the network 106 through the communication link 108. The communication link 108 comprises any suitable communication link, such as a wireless link based on OFDM technology that operates to allow the server 104 to communicate with the network 106. The network 106 comprises any combination of wired and/or wireless networks that allows services to be delivered from the server 104 to devices in communication with the network 106, such as the device 102.

The device 102 in this aspect comprises a mobile telephone that communicates with the network 106 through the wireless link 110. The wireless link 110 comprises a forward wireless communication link based on OFDM technology and a reverse link provided by any suitable technology. However, in other aspects, the wireless link 110 may comprise any suitable wireless technology that operates to allow communication between devices and the network 106.

The device 102 takes part in an activation process that allows the device 102 to subscribe to receive services over the network 106. The activation process may be performed with the server 104; however, the activation process may also be performed with some other server, service provider, content retailer, or other network entity not shown. For the purpose of this description, it will be assumed that the device 102 performs the activation process with the server 104 and is now ready to subscribe and receive services from the server 104.

It should be noted that the network 106 may communicate with any number and/or types of portable devices within the scope of the aspects. For example, other devices suitable for use in aspects of the tracking system include, but are not limited to, a personal digital assistant (PDA), email device pager, a notebook computer, mp3 player, video player, or a desktop computer.

The server 104 comprises content that includes real time and non real time services. For example, the services comprise multimedia content that includes news, sports, weather, financial information, movies, and/or applications, programs, scripts, or any other type of suitable content or service. Thus, the services may comprise video, audio or other information formatted in any suitable format.

The content is input to baseband processing logic 112. The baseband processing logic 112 processes the content to produce a baseband waveform comprising one or more transmission frames that contain the content. For example, the baseband processing logic 112 may comprise encoders, interleavers, scramblers, mappers, D/A converters and/or any other type of baseband processing logic. The baseband processing logic 112 also operates to incorporate at the start of the transmission frame various pilot signals (i.e., TMD1 and TDM2) and WIC/LIC identifiers as described above.

The baseband waveform produced by the baseband processing logic 112 is input to a transmitter 114 that operates to modulate the baseband waveform into a transmit waveform. This transmit waveform is then transmitted over the network 106 to the device 102, as shown by path 116.

The device 102 receives the transmit waveform at receiving logic 118. The receiving logic 118 operates to provide any necessary processes to process the transmit waveform to obtain a baseband waveform that can be input to a decoder 122. The decoder 122 operates to decode the baseband waveform to obtain the transmitted services.

The receiving logic 118 comprises an aspect of a frequency tracking system 120. The frequency tracking system 120 operates to provide fast acquisition and frequency tracking of the received waveform so that it is possible to acquire the baseband waveform quickly and without errors. In an aspect, the frequency tracking system 120 operates to acquire and track frequency apart from other system parameters of the received waveform by using the WIC, LIC, and TDM2 symbols that are located at the start of a transmission frame. The periodic structure of the WIC, LIC, and TDM2 symbols is utilized to provide accurate frequency tracking. For example, these symbols are designed to convey data utilizing a periodic structure and they occur early in the transmission frame. Aspects of the frequency tracking system utilize this periodic structure to quickly establish accurate frequency tracking at the beginning of the transmission frame. Because the system establishes frequency tracking so quickly, information at the beginning of the transmission frame can be accurately decoded. A more detailed description of the frequency tracking system 120 is provided in another section of this document.

Therefore, aspects of a frequency tracking system operate to quickly and efficiently acquire and frequency track a received waveform. It should be noted that the frequency tracking system is not limited to the implementations described with reference to FIG. 1, and that other implementations are possible within the scope of the aspects.

Figure 2:
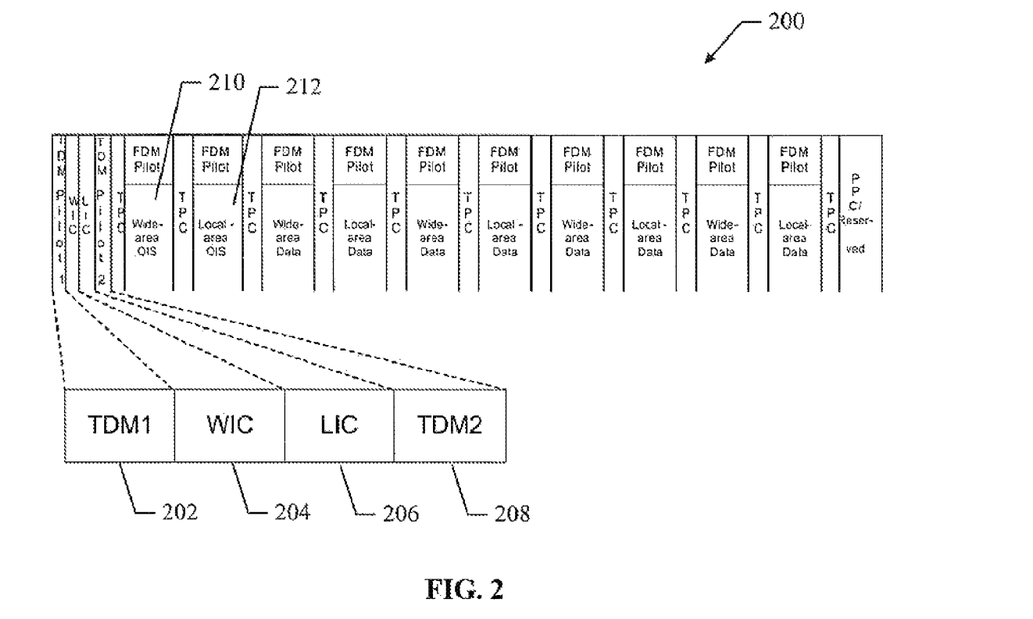
FIG. 2 shows an aspect of a transmission frame for use in a frequency tracking system.

FIG. 2 shows an aspect of a transmission frame 200 for use in a frequency tracking system. The frame 200 comprises first time division multiplex (TDM1) pilot symbols 202, WIC symbols 204, LIC symbols 206, and second (TDM2) pilot symbols 208. The frame 200 also comprises wide area overhead information symbols (WOIS) 210 and local area overhead information symbols (LOIS) 212. Once transmitted, the frame 200 is received as a radio frequency waveform by a receiving device.

In an aspect, the frequency tracking system utilizes the periodic structure of the WIC, LIC, and TDM2 symbols to provide fast frequency acquisition and tracking Frequency tracking in WIC, LIC, and TDM2 symbols ensures that the residual frequency error that may occur after an initial frequency acquisition using only TDM1 is corrected before the demodulation of OIS symbols is started. This minimizes the demodulation errors caused due to frequency offset.

Figure 3:
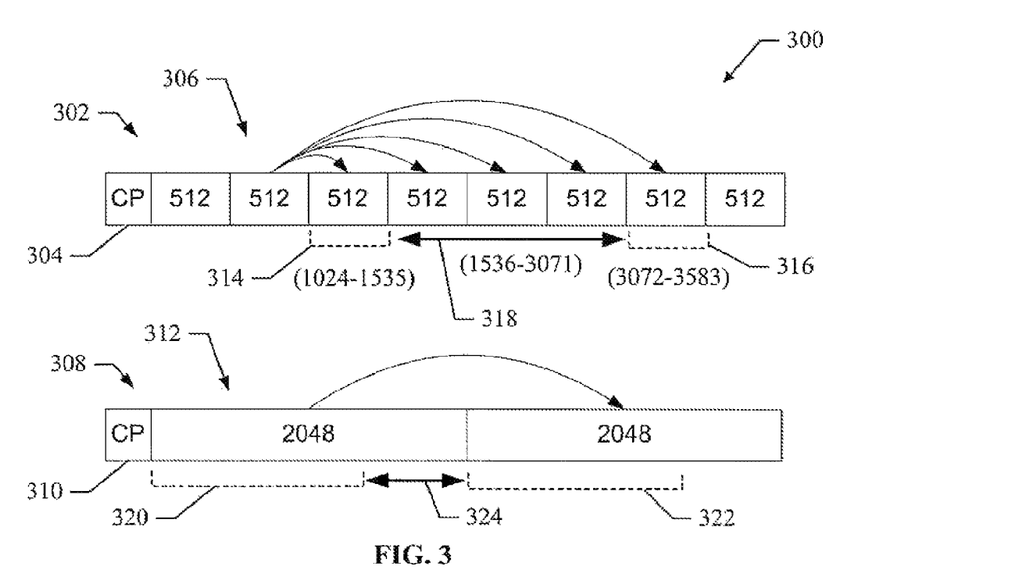
FIG. 3 shows a diagram that illustrates the periodic structure of WIC, LIC, and TDM2 symbols for use in aspects of a frequency tracking system.

FIG. 3 shows a diagram 300 that illustrates the periodic structure of the WIC, LIC, and TDM2 symbols for use in aspects of a frequency tracking system. A WIC or LIC symbol is illustrated at 302. The WIC/LIC symbol 302 comprises a cyclic prefix 304 following by a periodic data portion comprising eight groups of 512 subcarriers shown generally at 306. For example, the eight groups 306 have identical frequency components. Thus, the WIC/LIC symbol 302 has a periodic structure with respect to individual groups, or a combination of groups.

A TDM2 symbol is illustrated at 308. The TDM2 symbol 308 comprises a cyclic prefix 310 followed by a periodic portion comprising two groups of 2048 subcarriers shown generally at 312. For example, the two groups 312 have identical frequency components. Thus, the TDM2 symbol 308 has a periodic structure with respect to two groups 312.

In an aspect, the periodic structure of the WIC/LIC 302 and TDM2 308 symbols is utilized to provide fast and accurate frequency tracking. It should be noted that aspects of the frequency tracking system are not limited to the periodic structures of the symbols shown in FIG. 3, and that symbols having other periodic structures are suitable for use in aspects of the frequency tracking system. A more detailed discussion of the utilization of the periodic structure of these symbols is provided in another section of this document.

Figure 4:
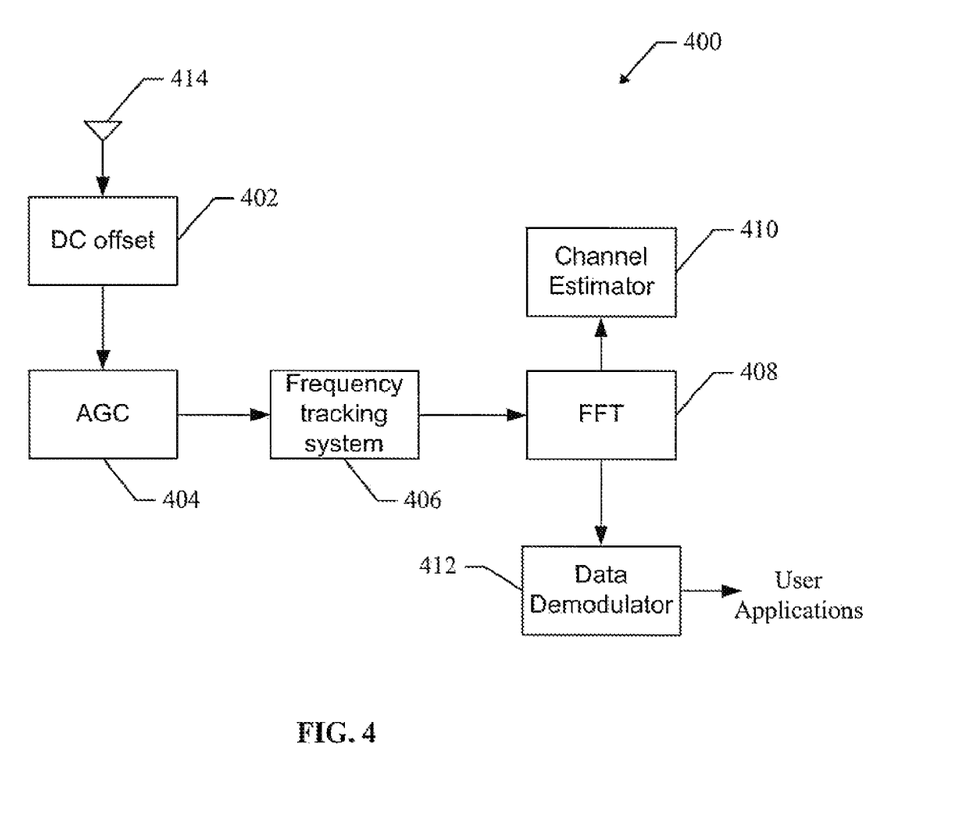
FIG. 4 shows receiving logic that comprises an aspect of a frequency tracking system.

FIG. 4 shows receiving logic 400 that comprises an aspect of a frequency tracking system. For example, the receiving logic 400 is suitable for use as the receiving logic 118 in FIG. 1. The receiving logic 400 comprises DC offset logic 402 that adjusts a DC offset of a transmit waveform received through antenna 414. For example, the transmit waveform comprises a transmission frame as illustrated in FIG. 2. The output of the DC offset logic 402 is input to automatic gain control logic (AGC) 404 that adjusts the gain of the received waveform.

The output of the AGC 404 is input to an aspect of a frequency tracking system 406. The frequency tracking system 406 operates to quickly and accurately acquire and track the frequency of the received waveform. For example, aspects of the frequency tracking system 406 utilize the periodic structure of the WIC, LIC, and TDM2 symbols in the received transmission frame to quickly generate an accurate digital frequency estimate. A more detailed description of the frequency tracking system 406 is provided in another section of this document.

The digital frequency estimate output from the frequency tracking system 406 is used to adjust the frequency of the input to FFT logic 408. The FFT logic 408 operates on the frequency adjusted samples to generate input to channel estimator 410 and data demodulator 412 blocks. The channel estimate 410 operates to produce a channel estimate that is used by the receiving logic. The data demodulator 412 operates on the samples whose frequency is adjusted by the frequency estimate to demodulate data symbols in the transmission frame for use by user applications.

Figure 5:
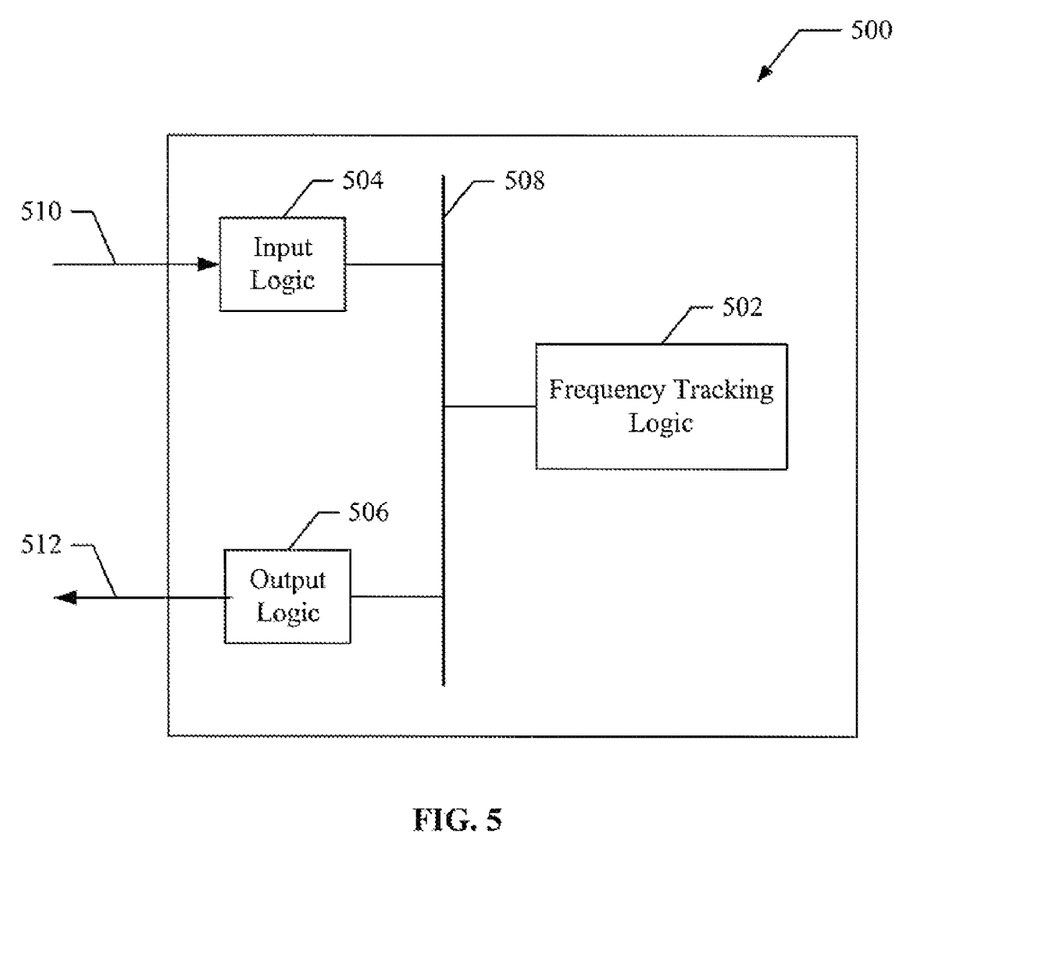
FIG. 5 shows an aspect of a frequency tracking system.

FIG. 5 shows an aspect of a frequency tracking system 500. For example, the tracking system 500 is suitable for use as the tracking system 120 shown in FIG. 1. The tracking system 500 comprises frequency tracking logic 502, input logic 504, and output logic 506 all coupled to a data bus 508.

The input logic 504 comprises any suitable hardware and/or software that operates to receive a transmit waveform and produce waveform samples. For example, the input logic 504 comprises processing logic, filters, amplifiers, A/D converters, decoders, and/or any other suitable hardware and/or software for receiving a transmit waveform and producing waveform samples. In an aspect, the waveform samples comprise time domain versions of the WIC, LIC and TDM2 symbols that are received in the transmit waveform.

The frequency tracking logic 502 comprises a CPU, processor, gate array, hardware logic, virtual machine, software, and/or any combination of hardware and software. The frequency tracking logic 502 operates to perform a frequency tracking algorithm to process waveform samples to produce a frequency estimate that can be used to acquire and frequency track a received waveform. For example, in an aspect, the frequency tracking algorithm utilizes the structure of the WIC, LIC, and TDM2 symbols to quickly and accurately produce a frequency estimate. Once the frequency tracking logic 502 determines the frequency estimate, the estimate is passed to the output logic 506.

The output logic 506 comprises any suitable hardware and/or software that operate to output the frequency estimate determined by the frequency tracking logic 502 to other portions of a receiving device, such as a data demodulator.

In an aspect, the frequency tracking system comprises a computer program having one or more program instructions ("instructions") stored on a computer-readable medium, which when executed by at least one processor, for instance, a processor located at the frequency tracking logic 502, operates to provide the functions of the frequency tracking system described herein. For example, instructions may be loaded into the frequency tracking logic 502 from a computer-readable media, such as a floppy disk, CDROM, memory card, FLASH memory device, RAM, ROM, or any other type of memory device or computer-readable medium that interfaces to the frequency tracking logic 502. In another aspect, the instructions may be downloaded into the frequency tracking logic 502 from an external device or network resource. The instructions, when executed operate to provide aspects of a frequency tracking system as described herein.

Thus, the frequency tracking system 500 operates to quickly and efficiently acquire and frequency track a received waveform. It should be noted that the frequency tracking system 500 is just one implementation and that other implementations are possible within the scope of the aspects.

Tracking Algorithm

In one or more aspect, a frequency tracking algorithm is provided that operates to provide fast acquisition and frequency tracking of a received waveform. For example, in an aspect, the frequency tracking logic 502 operates to perform the frequency tracking algorithm described below.

The tracking system provides a tracking algorithm that determines a frequency estimate based on the WIC, LIC, and TDM2 symbols. For example, the WIC, LIC, and TDM2 symbols may be formatted as the WIC 204, LIC 206, and TDM2 208 symbols shown in FIG. 2. In an aspect, the result of frequency tracking using the WIC 204 symbol is applied at the beginning of tracking using the LIC 206 symbol, and the result of tracking using the LIC 206 symbol is applied at the beginning of tracking using the TDM2 208 symbol. Similarly, the results of tracking in TDM2 is applied at the beginning of data demodulation. Thus, the tracking algorithm operates to provide fast acquisition and frequency tracking prior to data demodulation.

In each WIC/LIC symbol, the same 512 OFDM time domain samples are repeated eight times. After an initial frequency and coarse timing estimate, which may be performed using the TDM1 symbol, there is a timing uncertainty of −512 to +256 OFDM samples depending on the channel profile. In an aspect of the tracking algorithm, two windows are chosen that identify samples to be correlated. For example, referring to FIG. 3, a first window 314 and a second window 316 are chosen. The windows 314, 316 have a selected size, which in this example, is equal to 512 samples. However, other window sizes may be chosen as well. The windows 314, 316 are separated by a periodicity factor 318. The periodicity factor 318 represents the number of samples between the two windows, which is based on the repeating structure of the samples in the windows.

In the TDM2 symbol 308, 2048 time domain samples are repeated twice. Therefore, the structure of TDM2 presents periodicity in the time domain similarly to the WIC/LIC 302 symbols. In an aspect, it is desirable to choose two windows of 512 samples, separated by 2048 samples to perform delayed correlation. Such an implementation can use hardware designed for frequency tracking in all of the WIC, LIC, and TDM2 symbols, and thus leads to reduced hardware complexity. It is also possible to choose windows of different size, separated by 2048 or 4096 samples in TDM2 to perform delayed correlation to arrive at a frequency estimate. In an aspect, the frequency tracking algorithm operates as follows.

Let $r_{m,k}$ denote a received sampled sequence of an OFDM symbol. Then $r_{m,k}$ is defined by the following expression;

$$r_{m,k} = x_{m,k} e^{j(2\pi \Delta f(mN_T + k) + \phi)} + n_{m,k}$$

where $x_{m,k}$ denotes the channel output sequence consisting of the transmitted signal convolved with the channel impulse response, m denotes the OFDM symbol index, k denotes the sample index, $N_T$ denotes the total number of samples per OFDM symbol, $\Delta f'$ is the normalized frequency offset ((Hz) multiplied by one OFDM sample duration (sec)) and $\phi$ is the initial phase offset.

Due to their periodic structure, the OFDM samples in the WIC, LIC and TDM2 symbols can be expressed as follows;

$$x_{m,k} = x_{m,k+512}, \text{ (for } k=0, 1, 2, \ldots, 4095\text{) (WIC, LIC)}$$

$$x_{m,k} = x_{m,k+2048}, \text{ (for } k=0, 1, 2, \ldots, 2048\text{) (TDM2)}$$

Then the output of the frequency tracking logic 502 during tracking is given by the following equation when N is 2048.

$$z_m = \text{Im}\left[\sum_{k=1024}^{1535} r_{m,k}^* r_{m,k+N}\right]$$

$$= \sin(2\pi\Delta f' N) \sum_{k=1024}^{1535} |x_{m,k}|^2 + \sum_{k=1024}^{1535} \text{Im}\{x_{m,k}^* n_{m,k+N} e^{-j2\pi\Delta f'}\} +$$

$$\sum_{k=1024}^{1535} \text{Im}\{x_{m,k+N} n_{m,k}^* e^{-j2\pi\Delta f'(k+N)}\} + \sum_{k=1024}^{1535} \text{Im}\{n_{m,k}^* n_{m,k+N}\}$$

$$\approx 2\pi\Delta f' N \sum_{k=1024}^{1535} |x_{m,k}|^2 + \sum_{k=1024}^{1535} \text{Im}\{x_{m,k}^* n_{m,k+N} e^{-j2\pi\Delta f' k}\} +$$

$$\sum_{k=1024}^{1535} \text{Im}\{x_{m,k+N} n_{m,k}^* e^{-j2\pi\Delta f'(k+N)}\} + \sum_{k=1024}^{1535} \text{Im}\{n_{m,k}^* n_{m,k+N}\}$$

$$= G_D \Delta f' + \sum_{k=1024}^{1535} \text{Im}\{x_{m,k}^* n_{m,k+N} e^{-j2\pi\Delta f' k}\} +$$

$$\sum_{k=1024}^{1535} \text{Im}\{x_{m,k+N} n_{m,k}^* e^{-j2\pi\Delta f'(k+N)}\} + \sum_{k=1024}^{1535} \text{Im}\{n_{m,k}^* n_{m,k+N}\}$$

where;

$$G_D = 2\pi N \sum_{k=1024}^{1535} |x_{m,k}|^2$$

The first term in the equation above is the desired frequency error multiplied by detector gain $G_D$. With fixed AGC settings, $$\sum_{k=1024}^{1535} |x_{m,k}|^2$$

is assumed top be approximately constant and equal to 512 times the energy of the received signal per sample. The second and third terms in the equation above represent the noise that is input to the loop. Assuming that sequences $\{x_{m,k}\}$ and $\{n_{m,k}\}$ are IID and that each has a zero mean Gaussian with a variance of $\sigma_s^2$ and $\sigma_n^2$, respectively, the total input noise can be shown to be white, with a zero mean and a variance of $512\sigma_s^2\sigma_n^2 = 256\sigma_n^4$.

The frequency error estimate for the $m^{th}$ received OFDM symbol is then:

$$\hat{\Delta f}' = \frac{z_m}{G_D}$$

In an aspect, the tracking algorithm performs tracking in WIC/LIC/TDM2 OFDM symbols utilizing a one-tap filter to update a frequency estimate according to;

$$f_{n+1} = f_n + \alpha \Delta f_n$$

where $f_n$ is the frequency estimate used to rotate the nth OFDM symbol, and $\Delta f_n$ is the frequency error estimate from the frequency estimation block in the nth OFDM symbol. A loop gain ($\alpha$) is used to update the loop. The correlation between two OFDM samples is accumulated and then the imaginary part of it is scaled to derive $\Delta f_n$. Note that other realizations of the filters exist for filtering the obtained frequency error estimate.

Figure 6:
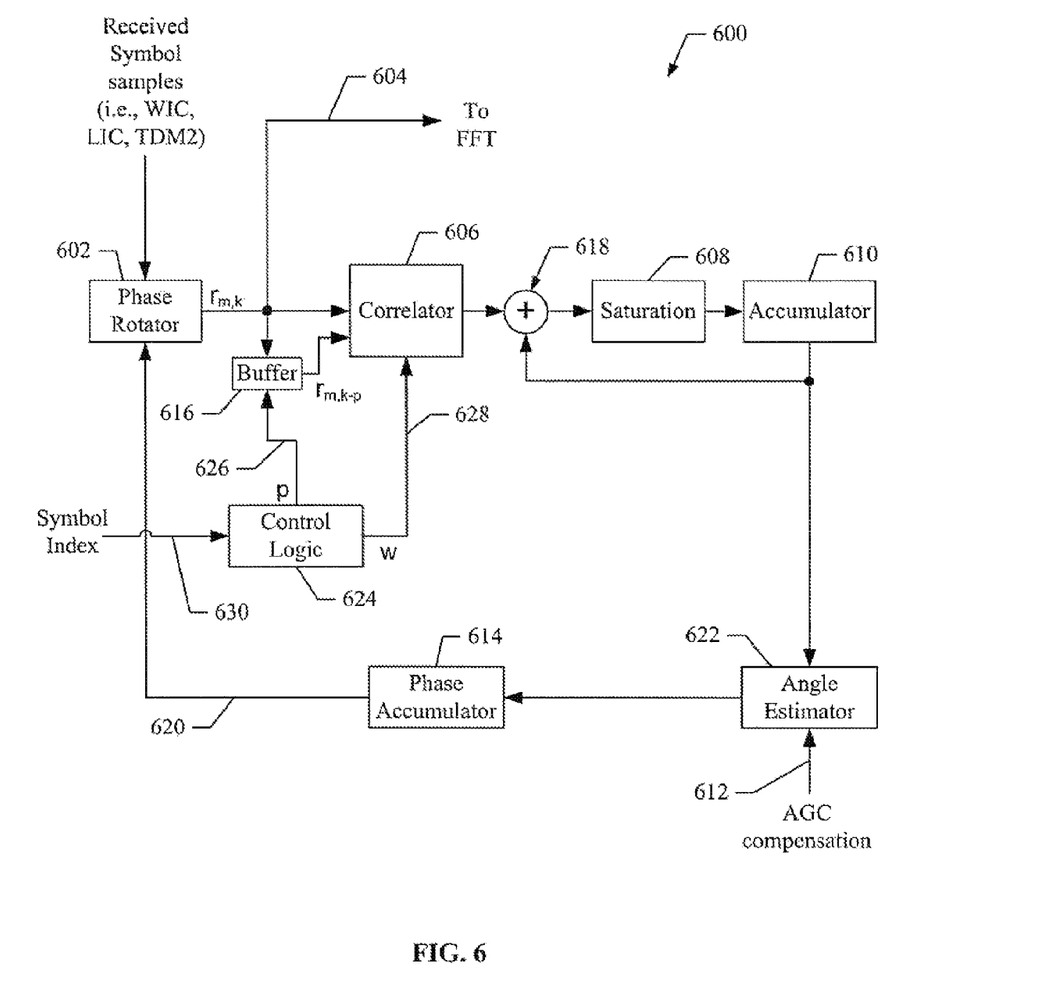
FIG. 6 shows a detailed diagram of frequency tracking logic for use in aspects of a frequency tracking system.

FIG. 6 shows a detailed diagram of an aspect of frequency tracking logic 600 for use in a frequency tracking system. For example, the frequency tracking logic 600 is suitable for use as the frequency tracking logic 502 shown in FIG. 5. In an aspect, the frequency tracking logic 600 operates to calculate a frequency error estimate ($\Delta f_n$) that is used to update a current frequency estimate. In an aspect, the frequency tracking logic 600 operates to determine the frequency error estimate from one or more symbols having a periodic structure such at the WIC, LIC, and TDM2 symbols described above.

The frequency tracking logic 600 comprises control logic 624 that operates to receive a symbol index 630 and generate a periodicity factor (p) 626 and window size (w) 628. For example, the control logic 624 may be a memory that is preprogrammed to generate a selected window size and periodicity factor based on the symbol index value. The window size 628 indicates how many samples of the selected symbol are to be included in a correlation provided by a correlator 606. The periodicity, factor 626 indicates how many samples are between two windows and is based on the periodic structure of the symbol. For example, assuming a WIC symbol is received and identified by the symbol index 630, the window size 628 may represent one or more groups of 512 samples as illustrated in FIG. 3. The periodicity factor 626 is based on the number of samples between two windows, which reflects the periodic structure of the symbol. For example, the WIC symbol structure comprises eight periods of data, which may be correlated in various combinations. For example, the first group may be correlated with the sixth group, or the second and third groups may be taken together and correlated with the fifth and sixth groups. Thus, the window size 628 and periodicity factor 626 operate to identify groups of samples having a periodic structure that are to be correlated.

A phase rotator 602 operates to receive input samples comprising the WIC, LIC and TDM2 symbols. The phase rotator 602 operates to rotate the phase of the received samples using an error estimate 620 to produce a frequency estimate 604 that comprises the sample sequence $r_{m,k}$. The frequency estimate 604 is passed to FFT logic and used to demodulate data and facilitate other functions at a receiving device.

The frequency estimate 604 is also input to a buffer 616 and the correlator 606. The buffer 616 operates to buffer samples of the frequency estimate 604 to produce a buffer output $r_{m,k-p}$, where "p" represents the periodicity factor. For example, as illustrated in FIG. 3, the WIC, and LIC symbols 302 may have a window size of 512 samples as shown at 314 and 316, and a periodicity of 1536 samples, as shown at 318. The TDM2 symbol 308 has a window size indicated by 320 and 322, and a periodicity indicated by 324.

The correlator 606 operates to correlate the current frequency estimate 604 with the buffered output to produce a correlation value that is input to saturation logic 618. For example, the buffered output is formed by delaying samples according to the periodicity factor 626.

The summing logic 618 operates to sum the correlation value with an accumulation value 624 to produce a summation value that is input to saturation logic 608. The saturation logic 608 operates to scale the summation value and produce a scaled summation value that is input accumulation logic 610. The accumulation logic 610 accumulates the scaled summation values to form the accumulation value 624, which is input to an angle estimator 622.

The angle estimator 622 operates to determine a phase of the accumulation value 624 using an AGC compensation value 612. A phase output is produced that is input to a phase accumulator 614, which produces the error estimate 620.

In an aspect, the frequency tracking logic 600 is implemented by at least one processor configured to execute machine readable instructions to provide the functions of the frequency tracking system described herein. In another aspect, the frequency tracking logic 600 is implemented by discrete functional elements comprising any combination of hardware and/or software.

During operation, two OFDM samples that are separated by a selected periodicity factor are used to produce a frequency estimate. At the angle estimator 622, an AGC gain compensation value 612 is input that is multiplied by the processed correlation value. Typically, the AGC gain compensation value 612 is selected such that a loop gain ($\alpha$) can be set to 0.8, 0.4, 0.2, 0.1, 0.05, and 0.025. In an aspect, the gain compensation value 612 is selected such that the loop gain $\alpha$ is set to a value of 1.

In an aspects, an initial frequency estimate (i.e., based on the TDM1 symbol) provides a larger frequency estimation error than the frequency tracking logic 600. Therefore, in a particular case when the initial frequency estimation has a large estimation error and the frequency tracking logic 600 operates to provide a smaller or zero estimation error, it is preferable to apply the frequency estimation result from frequency tracking system logic 600 immediately. This can be done by increasing the AGC gain compensator value 612 by 5/4, which provides loop gain values of 1, 0.5, 0.25, 0.125, and 0.0625. In an aspect the gain compensator value 612 is a software-programmable value and so it is also possible to easily use different values for WIC/LIC/TDM2 frequency tracking and tracking during regular OFDM symbols. Thus, two different set of AGC gain compensator values 612 can be used to realize the loop gain. In an aspect, the AGC gain compensator values 612 that are used to realize the loop gain of 0.8 are provided in Table 1 below.

TABLE 1

| AGC power setting (below full scale) | AFC Compensator Value |
| --- | --- |
| 12 dB | 31 |
| 11 dB | 25 |
| 10 dB | 20 |

Figure 7:
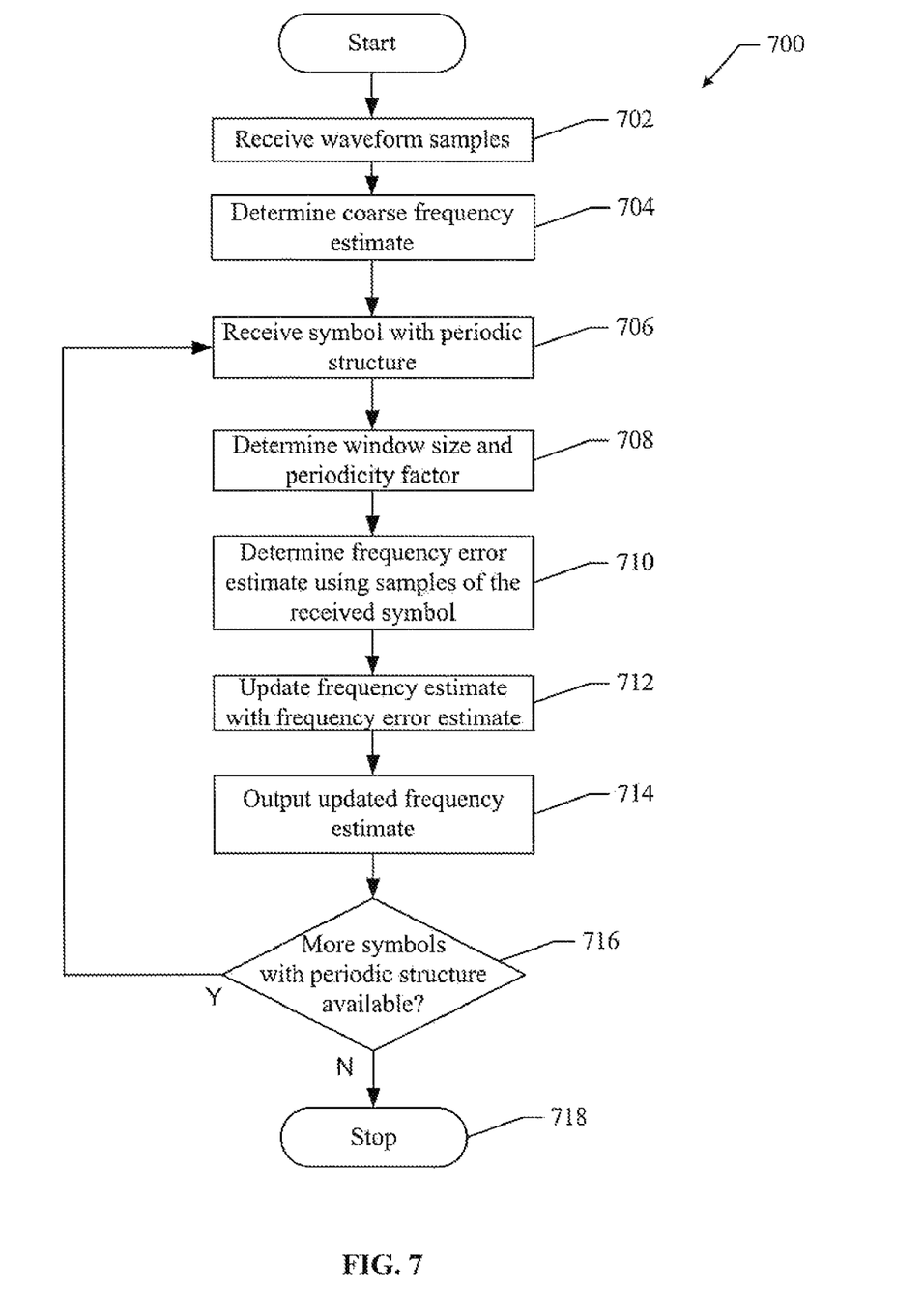
FIG. 7 shows a method for providing an aspect of a frequency tracking system.

FIG. 7 shows a method 700 for providing an aspect of a frequency tracking system. For example, in an aspect the frequency tracking logic 600 is configured to perform the method 700 as describe below.

At block 702, samples are obtained from a received waveform. For example, the input logic 304 operates to provide samples from a received waveform. In an aspect, the waveform comprises a transmission frame as illustrated in FIG. 2 that includes one or more symbols that have a periodic structure. For example, the symbols may by WIC, LIC, or TDM2 symbols as illustrated in FIG. 3.

At block 704, a coarse frequency estimate is determined. For example, any suitable technique may be used to determine the coarse frequency estimate based on a TDM1 symbol included in the received waveform.

At block 706, a symbol having a periodic structure is received. For example, a WIC, LIC or TDM2 symbol is received. In an aspect, samples of the received symbol are received and input to the phase rotator 602.

At block 708, a window size and a periodicity factor are determined. For example, based on the periodic structure of the symbol, a window size is selected that indicates the number of samples of the selected symbol that are to be used in a correlation function. The periodicity factor is selected to indicate the number of samples of the selected symbol that separate two windows to be correlated. For example, the control logic 624 operates to determine the window size, which is input to the correlator 606, and periodicity factor (p), which is input to the buffer 616. It should be noted that because of the periodic structure of the WIC, LIC and TDM2 symbols, it is possible to use the same window size and periodicity factor to perform the algorithm for all three symbols. In other aspects, different window sizes and periodicity factors are chosen for each symbol.

At block 710, a frequency error estimate is determined. For example, the frequency tracking logic 600 operates to determine a frequency error estimate 620 by correlating two windows containing samples of the received symbol. The two windows have a size that is defined by the window size parameter and are separated by an amount of samples determined from the periodicity factor.

At block 712, the current frequency estimate is updated with the frequency error estimate. For example, the phase rotator 602 operates to adjust the current frequency estimate with the frequency error estimate 620 to produce a new (or updated) frequency estimate 604.

At block 714, the updated frequency estimate is output. For example, the phase rotator 602 outputs the updated frequency estimate as the frequency estimate 604, which may be input to FFT logic at a receiving device.

At block 716, a test is performed to determine if there are more symbols with periodic structure at may be used to update the frequency estimate. For example, if a WIC symbol was just processed, there may be a LIC symbol or a TDM2 symbol that has a periodic structure that can be used to update the current frequency estimate. If there are more symbols with a periodic structure available, then the method proceeds to block 706. If there are no more symbols available, the method stops at block 718.

Thus, the method 700 operates to provide a frequency tracking system to allow a device to quickly acquire and frequency track a received signal. It should be noted that the method 700 represents just one implementation and the changes, additions, deletions, combinations or other modifications of the method 700 are possible within the scope of the aspects.

Figure 8:
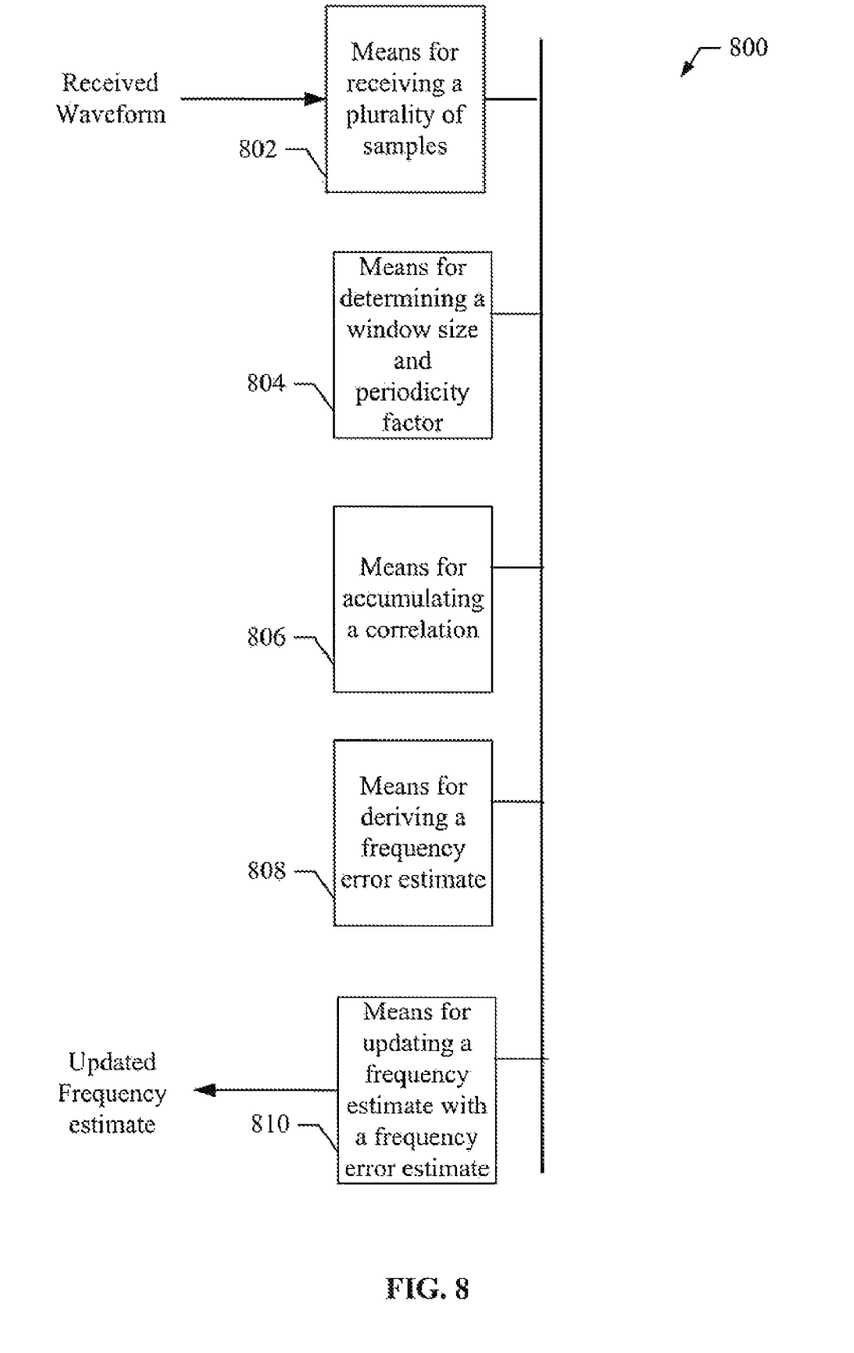
FIG. 8 shows an aspect of a frequency tracking system.

FIG. 8 shows an aspect of a frequency tracking system 800. The tracking system 800 comprises means (802) for receiving a plurality of samples. For example, in an aspect, the means 802 comprises the input logic 504 or the phase rotator 602.

The tracking system 800 also comprises means (804) for determining a window size and periodicity factor. For example, in an aspect the means 804 comprises the control logic 624.

The tracking system 800 also comprises means (806) for accumulating a correlation. For example, in an aspect, the means 806 comprises the correlator 606.

The tracking system 800 also comprises means (808) for deriving a frequency error estimate. For example, in an aspect, the means 808 comprises the phase accumulator 614.

The tracking system 800 also comprises means (810) for updating a frequency estimate with a frequency error estimate. For example, in an aspect, the means 810 comprises the phase rotator 602.

In an aspect, the means (802-810) comprise one or more processors configured to execute program instructions to provide aspects of a frequency tracking system as described herein.

Therefore various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, register, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects e.g., in art instant messaging service or any general wireless data communication applications without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a frequency tracking system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for frequency tracking of a received signal, wherein the received signal comprises one or more symbols having a periodic structure, the method comprising:
   receiving a plurality of samples of a selected symbol that comprises pilot signals scrambled with data;
   determining a window size and a periodicity factor;
   accumulating a correlation between samples in a first window, and samples in a second window to produce an accumulated correlation value, wherein the first and second windows have a size and a separation based on the window size and the periodicity factor, respectively; and
   deriving a frequency error estimate based on the accumulated correlation value by adjusting a current frequency estimate with the frequency error estimate to produce an updated frequency estimate according to $f_{n+1}=f_n+\alpha\Delta f_n$, where $\alpha$ is a loop gain value.

2. The method of claim 1, wherein said receiving comprises receiving the plurality of samples of the selected symbol, wherein the selected symbol is selected from one of a WIC, LIC, and TDM2 symbol.

3. The method of claim 1, wherein said determining comprises determining the window size and the periodicity factor to be common to multiple symbols.

4. An apparatus for frequency tracking of a received signal, wherein the received signal comprises one or more symbols having a periodic structure, the apparatus comprising:
   input logic configured to receive a plurality of samples of a selected symbol that comprises pilot signals scrambled with data;
   control logic configured to determine a window size and a periodicity factor;
   a correlator configured to accumulate a correlation between samples in a first window and samples in a second window to produce an accumulated correlation value, wherein the first and second windows have a size and a separation based on the window size and the periodicity factor, respectively; and
   a phase accumulator configured to derive a frequency error estimate based on the accumulated correlation value with a phase rotator configured to adjust a current frequency estimate with the frequency error estimate to produce an updated frequency estimate according to $f_{n+1}=f_n+\alpha\Delta f_n$, where $\alpha$ is a loop gain value.

5. The apparatus of claim 4, wherein said input logic is configured to receive the plurality of samples of the selected symbol, wherein the selected symbol is selected from one of a WIC, LIC, and TDM2 symbol.

6. The apparatus of claim 4, wherein said control logic is configured to determine the window size and the periodicity factor to be common to multiple symbols.

7. An apparatus for frequency tracking of a received signal, wherein the received signal comprises one or more symbols having a periodic structure, the apparatus comprising:
   means for receiving a plurality of samples of a selected symbol that comprises pilot signals scrambled with data;
   means for determining a window size and a periodicity factor;
   means for accumulating a correlation between samples in a first window and samples in a second window to produce in accumulated correlation value, wherein the first and second windows have a size and a separation based on the window size and the periodicity factor, respectively; and
   means for deriving a frequency error estimate based on the accumulated correlation value comprising means for adjusting a current frequency estimate with the frequency error estimate to produce an updated frequency estimate according to $f_{n+1}=f_n+\alpha\Delta f_n$, where $\alpha$ is a loop gain value.

8. The apparatus of claim 7, wherein said means for receiving comprises means for receiving the plurality of samples of the selected symbol, wherein the selected symbol is selected from one of a WIC, LIC, ad TDM2 symbol.

9. The apparatus of claim 7 wherein said means for determining comprises means for determining the window size and the periodicity factor to be common to multiple symbols.

10. A computer-readable medium having a computer program comprising instructions, which when executed by at least one processor, operate to provide frequency tracking of a received signal, wherein the received signal comprises one or more symbols having a periodic structure, the computer program comprising:
    instructions for receiving a plurality of samples of a selected symbol that comprises pilot signals scrambled with data;
    instructions for determining a window size and a periodicity factor;
    instructions for accumulating a correlation between samples in a first window and samples in a second window to produce an accumulated correlation value, wherein the first and second windows have a size and a separation based on the window size and the periodicity factor, respectively; and
    instructions for deriving a frequency error estimate based oil the accumulated correlation value by adjusting a current frequency estimate with the frequency error estimate to produce an updated frequency estimate according to $f_{n+1}=f_n+\alpha\Delta f_n$, where $\alpha$ is a loop gain value.

11. The computer program of claim 10, wherein said instructions for receiving comprise instructions for receiving the plurality of samples of the selected symbol, wherein the selected symbol is selected from one of a WIC, LIC, and TDM2 symbol.

12. The computer program of claim 10, wherein said instructions for determining comprise instructions for determining the window size and the periodicity factor to be common to multiple symbols.

13. At least one processor configured to perform a method for frequency tracking of a received signal, wherein the received signal comprises one or more symbols having a periodic structure, the method comprising:
    receiving a plurality of samples of a selected symbol that comprises pilot signals scrambled with data;
    determining a window size and a periodicity factor;
    accumulating a correlation between samples in a first window and samples in a second window to produce an accumulated correlation value, wherein the first and second windows have a size and a separation based on the window size and the periodicity factor, respectively; and
    deriving a frequency error estimate based on the accumulated correlation value by adjusting a current frequency estimate with the frequency error estimate to produce an updated frequency estimate according to $f_{n+1}=f_n+\alpha\Delta f_n$, where $\alpha$ is a loop gain value.

14. The method of claim 13, wherein said receiving comprises receiving the plurality of samples of the selected symbol wherein the selected symbol is selected from one of a WIC, LIC, and TDM2 symbol.

15. The method of claim 13 wherein said determining comprises determining the window size and the periodicity factor to be common to multiple symbols.

* * * * *